United States Patent [19]

Kappenhagen

[11] 4,219,226
[45] Aug. 26, 1980

[54] CYLINDER JOINT

[75] Inventor: George A. Kappenhagen, Monroe Township, Monroe County, Pa.

[73] Assignee: Westinghouse Electric Corp., Pittsburgh, Pa.

[21] Appl. No.: 928,636

[22] Filed: Jul. 27, 1978

[51] Int. Cl.² ............................................. F16L 25/00
[52] U.S. Cl. ................................ 285/354; 285/DIG. 2; 285/388
[58] Field of Search ............... 285/353, 354, 356, 384, 285/387, 388, 392, 393, 386, 395, DIG. 2, 4

[56] References Cited

U.S. PATENT DOCUMENTS

| | | | |
|---|---|---|---|
| 1,675,808 | 7/1928 | Kliss | 285/388 |
| 1,703,696 | 2/1929 | Stratford | 285/388 |
| 2,119,331 | 5/1938 | Jensen | 285/354 X |
| 2,148,746 | 2/1939 | Hampe et al. | 285/354 X |
| 3,315,987 | 4/1967 | White | 285/353 X |
| 3,476,414 | 11/1969 | Condrac | 285/354 X |
| 3,488,072 | 1/1970 | Allen et al. | 285/354 X |
| 3,520,561 | 7/1970 | Rininger | 285/286 X |
| 3,920,270 | 11/1975 | Bubb | 285/DIG. 2 |

FOREIGN PATENT DOCUMENTS

| | | | |
|---|---|---|---|
| 605269 | 7/1948 | United Kingdom | 285/384 |
| 801631 | 9/1958 | United Kingdom | 285/353 |

*Primary Examiner*—Dave W. Arola
*Attorney, Agent, or Firm*—D. R. Lackey

[57] ABSTRACT

A cylinder joint for joining two vertically oriented cylinder sections, which aligns the cylinders and supports the weight of the upper cylinder section on the upper end of the lower cylinder section. A split ring and locking collar assembly maintain the assembled relation of the cylinder sections, and it provides a mechanically strong, fluid-tight joint.

3 Claims, 2 Drawing Figures

CYLINDER JOINT

BACKGROUND OF THE INVENTION

1. Field of the Invention

The invention relates in general to pipe couplings, and more specifically to joints for coupling pipe sections such as used in hydraulic cylinders.

2. Description of the Prior Art

Hydraulic elevators use a jack unit which includes a plunger, and a cylinder made from steel pipe or steel tubing. When the required lift or vertical travel of the elevator exceeds approximately twenty feet, the cylinder is shipped to the job site in sections, which sections are then assembled to form the cylinder. It is conventional to weld an extension piece to one end of a cylinder section which includes a groove for an O-ring and external threads, and to weld an extension piece to one end of another cylinder section which includes a section having internal threads, and a section having a smooth bore for cooperating with the O-ring. The two sections must be very carefully vertically aligned with special tools to achieve and maintain alignment, and to provide adequate turning torque without distortion of the mating parts. If weight on the threads and lever forces due to whipping action of the top section are not carefully controlled, the joint will seize.

SUMMARY OF THE INVENTION

Briefly, the present invention is a new and improved pipe coupling or cylinder joint which greatly simplifies the procedure for interconnecting first and second cylinder sections. The first of the two sections to be joined has an externally threaded first coupling member fixed thereto, which includes a socket portion having a bore sized to receive the second cylinder section with a sliding fit. The two cylinder sections are aligned and then coupled, with the end of one section resting upon the end of the other section. The first coupling member automatically aligns the two cylinder sections and it maintains such alignment. A groove in the internal wall of the socket portion and an O-ring provide the required fluid seal.

A circumferential stop is fixed adjacent to the end of the second cylinder section, and a split ring is assembled about the second cylinder section. An internally threaded second coupling member, which was telescoped over the second cylinder section and circumferential stop prior to the start of assembly, is threadably engaged with the first coupling member, with the circumferential stop, split ring, and second coupling member all being configured to limit the threaded advancement of the second coupling member on the first, to lock the coupled cylinder sections in assembled relation. The same split ring and second coupling member may be used during shipment of a cylinder section to a job site, for securing a shipping cap to the end of the cylinder which includes the first coupling member.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
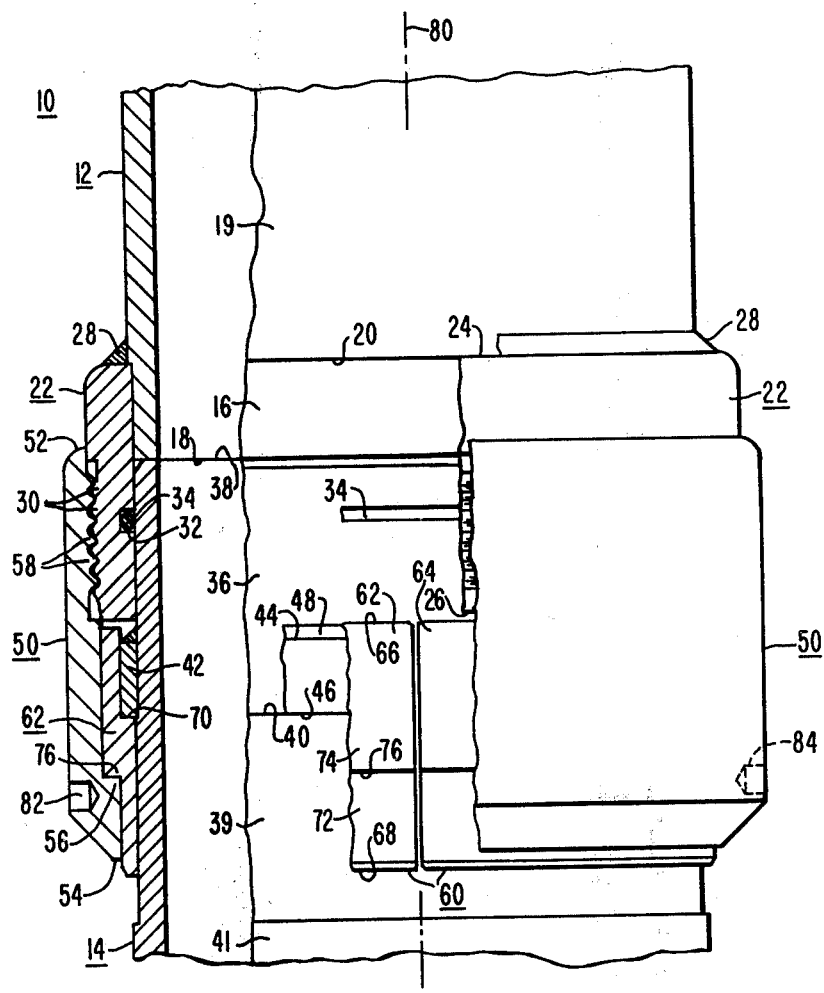
FIG. 1 is an elevational view, shown partially in section with parts broken away, of a cylinder joint constructed according to the teachings of the invention.

Referring now to the drawings, and to FIG. 1 in particular, there is shown an elevational view of a new and improved pipe coupling or cylinder joint 10 constructed according to the teachings of the invention. Cylinder joint 10 is shown partially cut away, and partially in section, in order to more clearly illustrate the various components of the joint. Cylinder joint 10 includes first and second cylinder sections 12 and 14, respectively, to be coupled. For purposes of example, the first cylinder section 12 is illustrated as being the upper section, and the second cylinder section 14 is illustrated as being the lower section, of a vertically oriented cylinder. However, their positions may be reversed, with the first cylinder section 12 being the lower section, and the second cylinder section 14 being the upper section. The invention applies to both arrangements, but will be described as illustrated in the drawings. The cylinder may include additional cylinder joints, depending upon the assembled length of the cylinder, with all of the cylinder joints being constructed in the same manner as the cylinder joint 10. The first and second cylinder sections are constructed of similarly dimensioned steel pipe or tubing, with typical outside diameters presently being in the range of 5 to 12 inches, and with wall thicknesses presently in the range of 0.220 to 0.375 inch, with the actual dimensions depending upon the specific application.

The first cylinder section 12 has a first surface 16 adjacent to its lower end 18 which defines a first outside diameter. The first outside diameter increases to a second diameter at a predetermined dimension from end 18, which second diameter is defined by a surface 19. A shoulder 20 is formed at the transition between the first and second diameters. In practice, the second diameter is the as-received diameter of the pipe, with the outside diameter of the cylinder section 12 being machined to provide the first diameter.

A first steel cylindrical coupling member 22 having first and second axial ends 24 and 26 and a bore which is selected to be a sliding fit with the first diameter defined by surface 16, is telescoped onto end 18 of the first cylinder section 12, until its end 24 contacts shoulder 20. The longitudinal length of the first coupling member 22 is selected such that its end 26 extends outwardly past end 18 of the cylinder section by a predetermined dimension. The predetermined dimension is selected such that it is sufficient to facilitate and maintain alignment of the first and second cylinder sections, as will be hereinafter explained. End 24 is then welded to the adjacent outer surface of the first cylinder section 12, as indicated by weld bead 28. The external surface of the first coupling member 22 is threaded, as indicated at 30, and its internal surface or bore includes an internal groove 32 for receiving a resilient sealing member 34, such as an O-ring.

The second cylindrical section 14 has a first surface 36 adjacent to its upper end 38 which defines a first outside diameter, which is the same as the first outside diameter of the first cylinder section 12. The first outside diameter increases to a second outside diameter, starting a predetermined dimension from end 38, which second diameter is defined by a second outer surface 39. The second outer surface 39 is formed by a "clean-up cut" performed adjacent to its end, to insure proper fit of the various components of the joint. Outer surface 41 is the original surface of the pipe or tube. A shoulder 40 is formed at the transition between the first and second different outside diameters.

A circumferential stop is provided on the outside diameter of the second cylinder section 14, such as by an annular or ring-shaped member 42. Member 42 has first and second axial ends 44 and 46, respectively, and an inside diameter which is selected to be a sliding fit with the first outside diameter of the second cylinder section 14. Member 42 is telescoped over end 38 until its end 46 contacts shoulder 40. Member 42 is secured in this position by welding end 44 to the outer surface of the second cylinder section 14, as indicated by weld base 48.

A second steel cylindrical coupling member 50 is provided which has first and second axial ends 52 and 54, respectively. Coupling member 50 includes an aperture or opening which starts at its second end 54, which has a first predetermined diameter sized to enable coupling member 50 to be telescoped over end 38 of the second cylinder section 14, and to clear or pass the circumferential stop provided by member 42. The inside diameter of the second coupling member 50, which started at end 54, then steps outwardly to a second inside diameter, which is larger than the first inside diameter, with the transition forming a shoulder 56. The bore continues smoothly at this larger inside diameter towards end 52 for a predetermined dimension, and then the inside diameter is threaded, as illustrated at 58, with the threads 58 being constructed to cooperate with the external threads 30 on the first coupling member 22.

A split ring assembly 60 is provided having first and second similar half sections 62 and 64, respectively. Since each half section 62 and 64 is similar to the other, only half section 62 will be described in detail. Half section 62 has first and second axial ends 66 and 68, respectively, and a substantially Z-shaped cross-sectional configuration. Specifically, half section 62 includes a surface having a first inside diameter, selected to be a sliding fit with the second outside diameter of the second cylinder section 14, with the first inside diameter starting at its end 68 and extending smoothly towards its end 66 for a predetermined dimension. It then steps outwardly to a surface having a second inside diameter, which is larger than the first inside diameter, forming a shoulder 70 at the transition. The second inside diameter is selected to be a sliding fit with the outside diameter of stop member 42.

Half section 62 has a first outer surface 72 having a first outside diameter which starts at end 68, and it extends smoothly towards end 66 for a predetermined dimension where it steps outwardly to a second outer surface 74 having a second outside diameter. The second outside diameter is larger than the first, and the second outside diameter extends smoothly to end 66. A shoulder 76 is formed at the transition between the first and second outside diameters. While shoulders 70 and 76 are illustrated as being 90°, they may be slightly less, or slightly greater than 90°, such as 85° or 95°, to increase the locking action of the split ring assembly 60.

In the assembly of the first and second cylinder sections 12 and 14, the second coupling member 50 is telescoped over end 38 of cylinder section 14, past the circumferential stop 42, and section 14 is oriented on vertical axis 80. The first cylinder section 12 is vertically oriented above section 14, on axis 80, and it is gently lowered such that end 18 enters the socket or outwardly extending portion of the first coupling member 22. This slip-fit coupling is continued until end 18 of the first section 12 rests upon end 38 of the second cylinder section 14, with the complete weight of section 12 being supported by section 14. This slip-fit coupling thus properly orients the two sections to be joined, and it aids in maintaining such alignment throughout the coupling procedure. By supporting the weight of the upper cylinder section on the upper end of the lower cylinder section, no weight is required to be supported by the threads of the coupling members.

The next step of the assembly procedure involves assembly of the two halves 62 and 64 of the split ring 60 about the second cylinder section 14 such that its smaller inside diameter is adjacent to surface 39, and its larger inside diameter is adjacent to the outer surface of the circumferential stop 42. In practice, the two halves 62 and 64 are assembled about surface 39 and allowed to drop against the second coupling member 50 such that shoulder 76 of the split ring assembly 60 rests upon shoulder 56 of the second coupling member 50. Then, the second coupling member 50 is raised until its threads 58 initially contact threads 30 of the first coupling member, which step also raises the split ring assembly 60 at the same time. The second coupling member 50 is then threadably engaged with the first coupling member 32, with the second coupling member 50 being advanced until shoulder 70 of the split ring 60 contacts stop member 42. Since there is no weight applied to the threads, and since the two sections are accurately aligned, coupling member 50 will turn freely until the circumferential stop 42 is reached. Now, a fraction of a turn by a suitable tool such as a spanner wrench, placed in suitable openings in the outside diameter of the second coupling member 50, such as openings 82 and 84, will cause the first and second coupling members, along with the split ring assembly 60 and stop member 42 to cooperate and function as a locking collar, which provides a strong mechanical joint, and a fluid-tight seal via the sealing ring 34.

Figure 2:
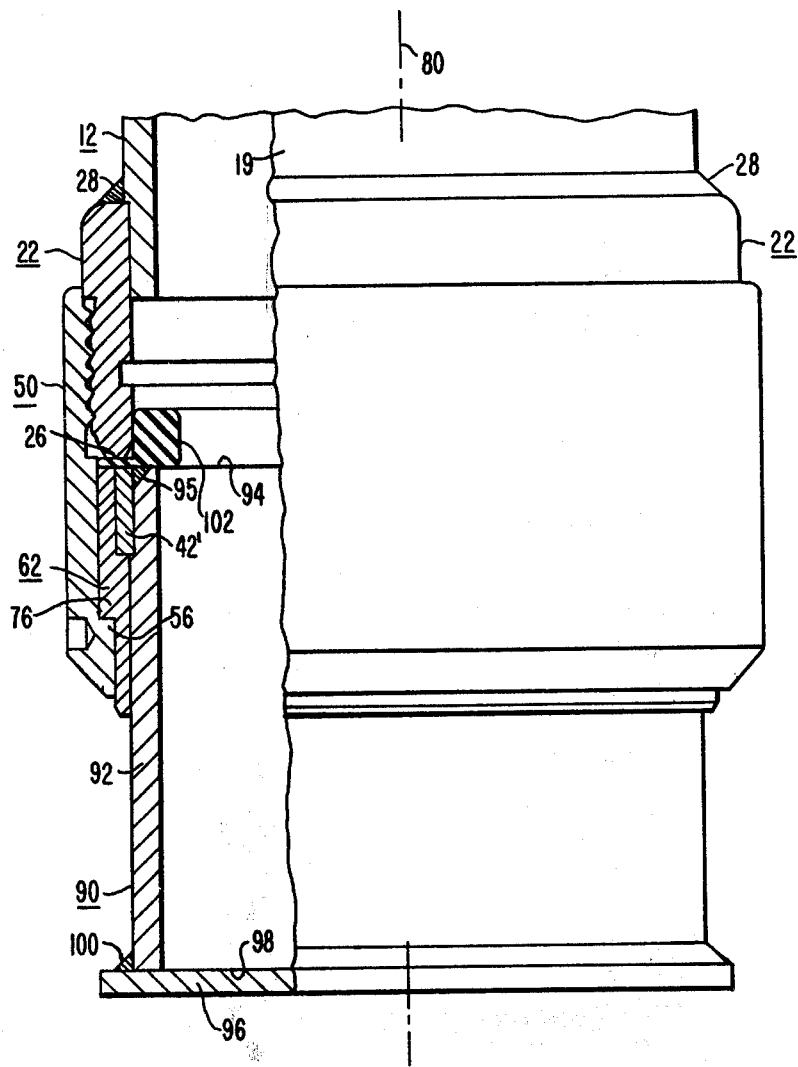
FIG. 2 is an elevational view shown partially in section, of a shipping cap secured to one end of a cylinder section, according to the teachings of the invention.

When the cylinder sections 12 and 14 are shipped, their top and bottom ends are protected via suitable top and bottom shipping caps. FIG. 2 illustrates that the cylinder joint components shown in FIG. 1 may be utilized during shipment to hold a bottom shipping cap 90 in assembled position with the first cylinder section 12. Like reference numerals in FIGS. 1 and 2 indicate like components, and they will not be described again.

More specifically, shipping cap 90 includes a cylindrical section 92 having a stop 42', similar to stop 42 of FIG. 1, welded to its upper end 94, as indicated by weld bead 95, and a cover 96 welded to its lower end 98, such as indicated by weld bead 100. It will be noted that stop member 42' is located at the extreme end 94, instead of being spaced therefrom by a predetermined dimension, since end 94 is not required to extend into the socket portion of the first coupling member 22.

A protective member 102 is disposed between end 94 of the shipping cap 90, and end 26 of the first coupling member 22, in order to protect the end of the first coupling member, and its I.D. provides the structure for supporting the jack plunger without damage. Protective member 102 may be formed of any suitable material, such as a laminated plastic, or a laminated and waxed pressed board.

In the assembly of the shipping cap 90 with the cylinder section, the second coupling member 50 is telescoped over end 94 of the shipping cap, past stop 42'. The split ring 62 is then dropped into position about section 92, with its shoulder 76 positioned against shoulder 56 of the second coupling member 50. The resilient member 102 is then positioned on end 94, and the first and second coupling members 22 and 50 are threadably engaged.

The split ring 60 enables the second coupling member 50 to be removed from the shipping cap for use in the cylinder joint 10 shown in FIG. 1. The split ring 60 also enables the second coupling member 50 to be removed from the second cylinder section 14.

I claim as my invention:

1. A cylinder joint for a hydraulic cylinder suitable for use in a hydraulic elevator, comprising:

first and second cylinder sections having first unthreaded ends to be coupled, an externally threaded first coupling member nonrotatably fixed to, and extending outwardly from, the first end of said first cylinder section, said first coupling member having a bore sized to slidably receive the first end of said second cylinder section, and an internal groove in the bore, a circumferential stop member fixed to the outer periphery of said second cylinder section, an internally threaded, rotatable second coupling member having a round outer configuration, a first internal diameter larger than the diameter of said circumferential stop, and a second internal diameter larger than the first, with the first and second internal diameters defining a shoulder therebetween, said second coupling member being telescoped over the first end of said second cylinder section and said circumferential stop member, a split ring assembled about said second cylinder section with gaps between adjoining ends thereof, said split ring being constructed to cooperate with said circumferential stop member to limit movement of the second coupling member towards the first end of said second cylinder section, said split ring having a substantially Z-shaped cross-sectional configuration, taken through a vertically oriented plane, including first and second internal diameters sized to snugly surround said circumferential stop member and said second cylinder section, respectively, said first and second internal diameters defining an internal shoulder which contacts the circumferential stop member, and further including first and second external diameters sized to snugly cooperate with the first and second internal diameters, respectively, of said second coupling member, said first and second external diameters defining an external shoulder, said first and second cylinder sections being coaxially disposed in a vertical orientation with their first ends facing and contacting one another, such that the weight of the upper cylinder section is supported by the lower cylinder section, with the first and second coupling members being threadably engaged to maintain the first and second cylinder sections in assembled relation, with no weight on the threads of the first and second coupling members, and with the internal shoulder of second coupling member contacting the external shoulder of said split ring, and a sealing ring disposed in the internal groove in the bore of the first coupling member, said sealing ring providing a fluid seal between the second cylinder section and the first coupling member, without regard to whether or not the first and second coupling members are threadably engaged.

2. The cylinder joint of claim 1 wherein the first and second cylinder sections have similar first outside diameters adjacent to their first ends, which first outside diameters step outwardly to similar second outside diameters to define external shoulders at the transitions which position the first coupling member and the circumferential stop, respectively.

3. Th cylinder joint of claim 2 wherein the circumferential stop includes an annular member having first and second ends disposed on the second cylinder sections, with the first end being disposed against the external shoulder, and with the second end fixed to the external surface of the second cylinder section.

* * * * *